US009305409B2

(12) United States Patent
Tsuyama

(10) Patent No.: US 9,305,409 B2
(45) Date of Patent: Apr. 5, 2016

(54) ELECTRONIC CONTROL UNIT

(71) Applicant: DENSO CORPORATION, Kariya, Aichi-pref. (JP)

(72) Inventor: Tomoya Tsuyama, Toyokawa (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/695,248

(22) Filed: Apr. 24, 2015

(65) Prior Publication Data

US 2015/0379787 A1 Dec. 31, 2015

(30) Foreign Application Priority Data

Jun. 27, 2014 (JP) ................................. 2014-133043

(51) Int. Cl.
*G06F 19/00* (2011.01)
*G06F 13/00* (2006.01)
*G07C 5/08* (2006.01)

(52) U.S. Cl.
CPC ...................................... *G07C 5/085* (2013.01)

(58) Field of Classification Search
CPC ......... G06F 12/02; G06F 3/06; G06F 3/0608; G06F 3/064; G06F 3/0676; G11B 2020/10898; G11B 5/012
USPC ............ 701/1, 115; 711/165, 170; 340/853.9, 340/995.18, 3.3, 3.32, 4.51, FOR. 215
See application file for complete search history.

(56) References Cited

U.S. PATENT DOCUMENTS 7,409,489 B2 * 8/2008 Sinclair ................. G06F 3/0605 365/185.11
7,451,265 B2 * 11/2008 Traister ............... G06F 12/0246 711/103
8,667,209 B2 * 3/2014 Lin ......................... G06F 12/00 711/103
8,904,069 B2 * 12/2014 Tanaka ...................... G06F 5/06 710/57
9,009,433 B2 * 4/2015 Ryu ........................ G06F 12/02 711/165
2007/0168632 A1 * 7/2007 Zeevi .................. G06F 12/0246 711/165
2008/0168252 A1 * 7/2008 Kunimune .......... G06F 12/0246 711/173
2011/0219172 A1 * 9/2011 Lin ......................... G06F 12/00 711/103
2013/0117520 A1 * 5/2013 Ryu ........................ G06F 12/02 711/165
2014/0015661 A1 1/2014 Fujime
2014/0019024 A1 1/2014 Fujime
2014/0039720 A1 * 2/2014 Talbot ................. B60R 16/0232 701/1

FOREIGN PATENT DOCUMENTS

JP H10-3433 A 1/1998
JP 2007-138726 A 6/2007
JP 2014-85709 A 5/2014

* cited by examiner

*Primary Examiner* — Muhammad Shafi
(74) *Attorney, Agent, or Firm* — Posz Law Group, PLC

(57) ABSTRACT

An electronic control unit comprises a central processing unit for calculating plural types of control data used for controlling a control object and a non-volatile memory rewritable of data. The processing unit writes sequentially type-affixed control data, in each of which type information indicating a type of control data is affixed to the control data, into a data write-in area in the non-volatile memory. When a hold condition corresponding to one of the plural types of control data is satisfied, the processing unit reads out the type-affixed control data, which includes the control data corresponding to a satisfied hold condition, from the data write-in area based on the type information, and writes the type-affixed control data read out from the data write-in area in a data holding area of the non-volatile memory.

7 Claims, 9 Drawing Sheets

ELECTRONIC CONTROL UNIT

CROSS REFERENCE TO RELATED APPLICATION

This application is based on Japanese patent application No. 2014-133043 filed on Jun. 27, 2014, the content of which is incorporated herein by reference.

FIELD

The present disclosure relates to an electronic control unit.

BACKGROUND

In an electronic control unit, which is mounted in a vehicle, for example, it is required to hold in a non-volatile memory control data, which is generated at time of detection of a certain abnormality or generated before the detection of such an abnormality. The control data, which is thus kept stored, is referred to as freeze frame data or freeze data and used to analyze a cause of generation of the abnormality, as exemplarily disclosed in JP 2007-138726A.

To meet the requirement described above, the following processing is proposed as one example. For each control data of plural kinds, which will possibly be required as the freeze frame data, memory areas for holding "m" (integer equal to or larger than 1) pieces of the control data are provided in the non-volatile memory. In this case, addresses for writing each data are pre-assigned. Last "M" pieces of each control data including the latest piece are written to be held continuously in the corresponding addresses in the data holding areas. According to this configuration, all kinds of control data are stored in the data holding areas upon detection of any abnormality.

Since the control data having only low relation to the detected abnormality, that is, control data which need not be stored usually, are also stored, the memory areas to be provided as the data holding areas need be increased.

SUMMARY

It is therefore an object to provide an electronic control unit, which is capable of decreasing a required size of data holding areas.

According to one aspect, an electronic control unit comprises a processing unit for calculating plural types of control data used for controlling a control object and a non-volatile memory, which is rewritable of data and connected to the processing unit. The processing unit is programmed to execute writing processing to write sequentially type-affixed control data, in each of which type information indicating a type of control data is affixed to the control data, into data write-in areas in the non-volatile memory. The processing unit is further programmed to read out, when a hold condition corresponding to one of the plural types of control data is satisfied, the type-affixed control data including the control data corresponding to a satisfied hold condition from the data write-in areas based on the type information, and write the type-affixed control data read out from the data write-in area in a data holding area of the non-volatile memory.

DETAILED DESCRIPTION OF THE EMBODIMENT

An electronic control unit according to one embodiment will be described below. An electronic control unit (referred to as ECU below) 11 shown in FIG. 1 is mounted in a vehicle and controls an engine of the vehicle, for example, as a control object.

Figure 1:
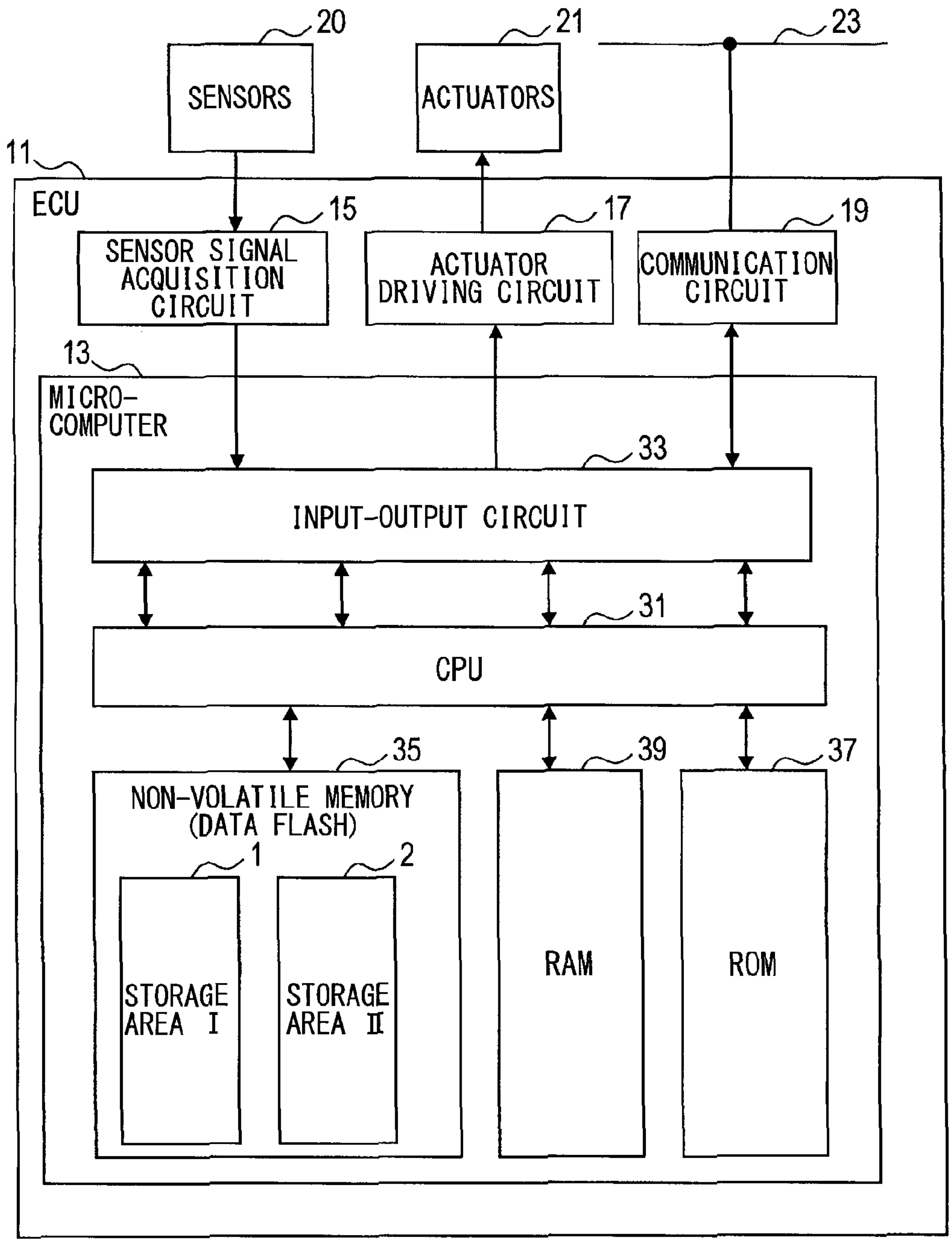
FIG. 1 is a block diagram showing an electronic control unit (ECU) according to one embodiment.

As shown in FIG. 1, the ECU 11 includes a microcomputer 13 for controlling an operation of the ECU 11, a sensor signal acquisition circuit 15, an actuator driving circuit 17 and a communication circuit 19.

The microcomputer 13 acquires information from various sensors 20, which detect engine conditions, through the sensor signal acquisition circuit 15. The microcomputer 13 executes arithmetic calculation operations for controlling the engine based on the information from the sensors 20 and outputs control signals to the actuator driving circuit 17 based on arithmetic operation results thereby to drive actuators 21, which operate the engine.

The sensors 20 may be a crank angle sensor for detecting a crankshaft angle of the engine, a water coolant temperature sensor for detecting a water coolant temperature of the engine, an air-fuel ratio sensor and the like. The actuators 21 may be injectors for injecting fuel into each cylinder of the engine, ignition devices for generating ignition sparks in each cylinder of the engine and the like.

A communication line 23 in the vehicle is connected to the ECU 11. The microcomputer 13 is connected to the communication line 23 through the communication circuit 19. The microcomputer 13 communicates with other electronic control units, which are connected to the communication line 23, through the communication circuit 19.

The microcomputer 13 includes a central processing unit (CPU) 31 for executing programs, an input-output circuit 33 for inputting and outputting signals, a non-volatile memory (data flash) 35, which is rewritable of data, a ROM 37 for storing programs to be executed by the CPU 31, and a volatile RAM 39 for storing arithmetic operation results of the CPU 31. The CPU 31 is connected to the input-output circuit 33, the data flash 35, the ROM 37 and the RAM 39. An operation of the microcomputer 13 is realized by execution of the programs stored in the ROM 37 by the CPU 31, which operates as a calculation circuit. That is, the CPU 31 is programmed to execute various processing stored in the ROM 37.

In the data flash 35, plural storage areas (two storage areas I and II in this example) are provided. The data flash 35 is capable of write-in data from a deleted state (for example, rewriting from "1" state to "0" in a case that the deleted state is "1") but is incapable of writing in reverse (rewriting from "0" to "1"). That is, deletion need be executed individually in unit of the storage area I and the storage area II Data processing, which the CPU 31 of the microcomputer 13 executes based on the programs stored in the ROM 37, will be described below with reference to FIG. 2. The cup 31 executes the data processing shown in FIG. 2 at every fixed time interval, for example.

Figure 2:
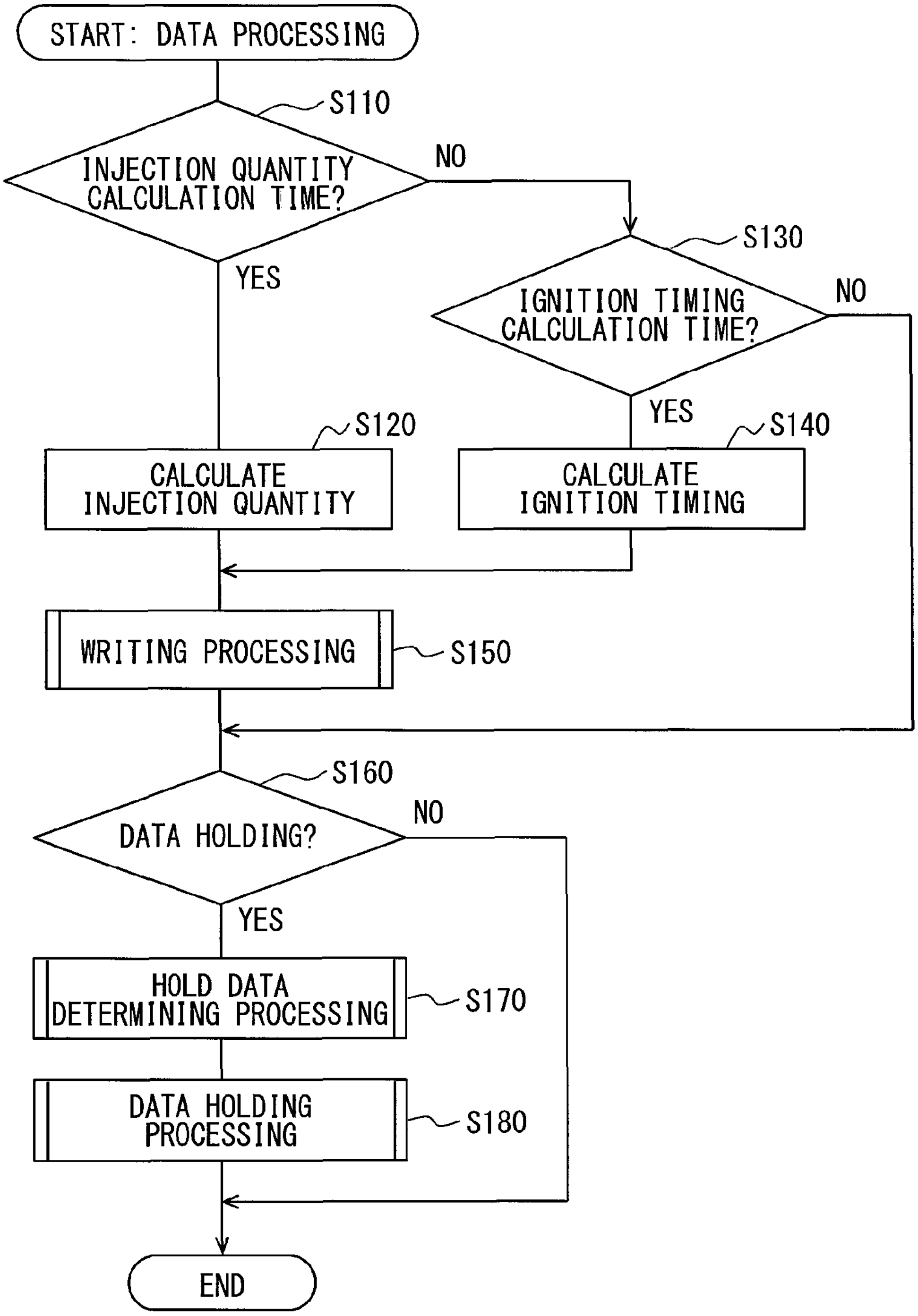
FIG. 2 is a flowchart showing data processing executed in the embodiment.

As shown in FIG. 2, after starting the data processing, the CPU 31 first checks at S110 whether it is an injection quantity calculation time. If it is the injection quantity calculation time, the CPU 31 executes an injection quantity calculation at S120 to calculate an injection quantity data indicating the injection quantity as a control data. Then the CPU 31 executes S150. The injection quantity indicates a quantity of fuel, which is injected from fuel injectors. Although not shown, the CPU 31 also executes processing for driving the fuel injectors based on the injection quantity data calculated at S120.

When it is determined at S110 that it is not the injection quantity calculation time, the CPU 31 checks at S130 whether it is an ignition timing calculation time. If it is the ignition timing calculation time, the CPU 31 executes at S140 an ignition timing calculation to calculate an ignition timing data indicating ignition timing, and then executes S150, which is writing processing. The ignition timing indicates a time point for driving the ignition device to generate an ignition spark. Although not shown, the CPU 31 also executes processing of driving the ignition device based on the ignition timing data calculated at S140.

The CPU 31 executes at S150 the writing processing for writing the control data (injection quantity data or ignition timing data in this example) calculated at S120 or S140 in either one of the storage areas I and II of the data flash 35, and then executes S160. Details of the writing processing will be described later with reference to FIG. 3.

When it is determined at S130 that it is not the ignition timing calculation time, the CPU 31 executes S160. The CPU 31 checks at S160 whether data holding (specifically, holding of control data) is required. The CPU 31 checks in abnormality detection processing, which is not shown, whether an abnormality arose with respect to each of plural types. If it is determined that the abnormality is detected, the CPU 31 stores a code indicating the detected abnormality (that is, diagnostic trouble code DTC) in a specific area in the data flash 35 or in other rewritable non-volatile memory. At S160, the CPU 31 refers to a check result of the abnormality detection processing. If the check result indicates that either one of the abnormalities occurred, the CPU 31 determines that the data holding is required.

When it is determined at S160 that the data holding is required, the CPU 31 executes at S170 hold data determining processing for determining hold data, which is control data to be held, that is, kept stored in the data flash 35. The CPU 31 further executes at next S180 data holding processing for holding the hold data determined at S170 in the data flash 35 and finishes the data processing. Details of the hold data determining processing at S170 and the data holding processing at S180 will be described later.

When it is determined at S160 that the data holding is not required, the CPU 31 finishes the data processing without executing S170 and S180. In the present embodiment, the control data are exemplified as two types, that is, injection quantity data and ignition timing data. However, the control data may include other data such as injection timing data indicating injection time point and water coolant temperature data indicating water coolant temperature.

Figure 3:
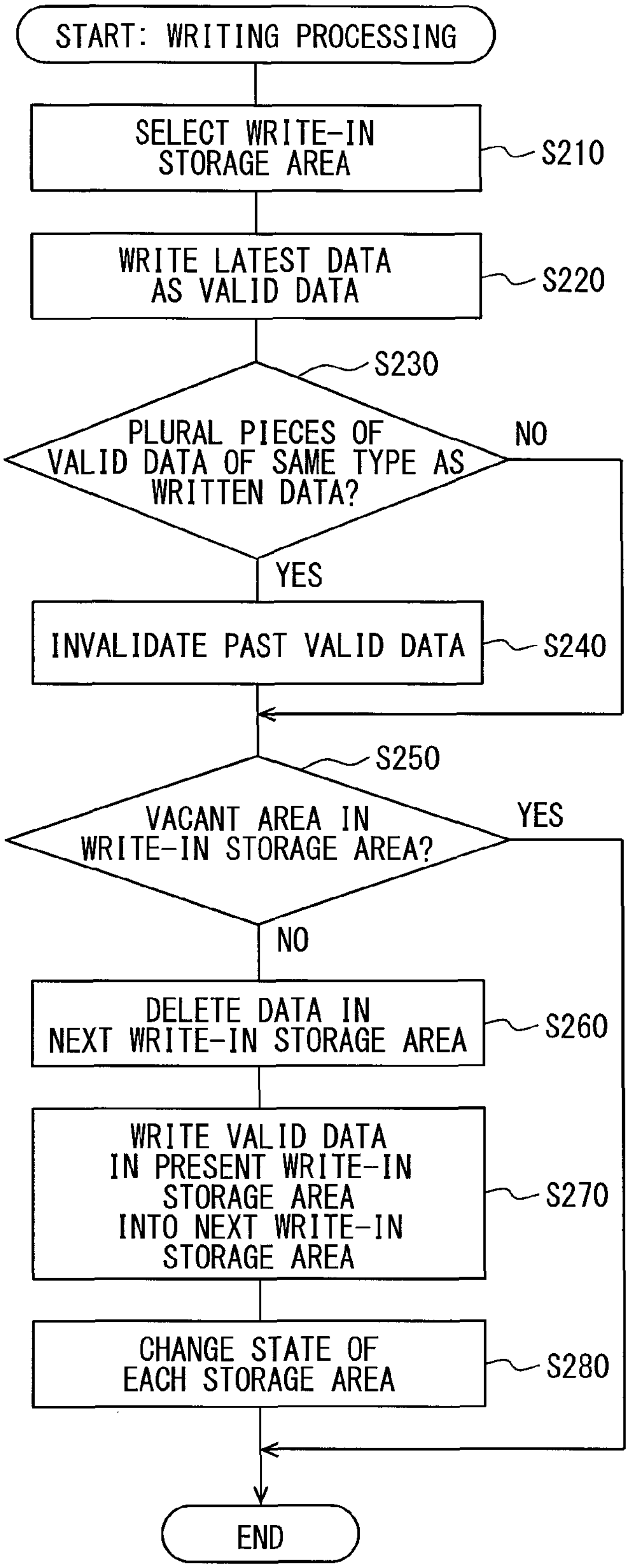
FIG. 3 is a flowchart showing writing processing in the data processing shown in FIG. 2.

The writing processing executed at S150 in FIG. 2 will be described with reference to FIG. 3. As shown in FIG. 3, after starting the writing processing, the CPU 31 first selects at S210 a write-in storage area, which is a storage area for writing the control data in, out of the plural storage areas I and II in the data flash 35.

The storage areas I and II are set to either one of three states, which are "active," "full" and "hold," to manage availability for data storing operation. The active state indicates that there is a vacant storage area, which is available for writing the data newly. The full state indicates that there is not the vacant storage area and not available for writing the data newly. The hold state indicates that the data should be kept stored and the writing and deleting are prohibited. The state of each of the storage areas I and II is switchable to either one of the above-described three states by changing state information provided for each of the storage areas I and II. At the time of production of the ECU 11, the storage areas I and II are initialized (that is, data is deleted) and set in the active states. The order of designation (referred to as order of use) of the storage areas I and II as the write-in storage areas is predetermined. In the present embodiment, the order of use is from the storage area I to the storage area II. That is, the storage area I has priority over the storage area II.

For this reason, the CPU 31 selects at S210 the storage area in the active state out of the storage areas I and II as the write-in storage area. In a case that there are plural storage areas in the active states, the CPU 31 selects as the write-in storage area the storage area, which has a lowest-numbered order of use, that is, highest priority, among the storage areas in the active states. As a result, the storage area I is selected first as the write-in storage area when S210 is executed first time after manufacture of the ECU 11. At the time of manufacture of the ECU 11, only the storage area I having the lowest-numbered order of use may be set in the active state and the other storage area II may be set in the full state.

The CPU 31 writes at next S220 the control data calculated at S120 or S140 this time (that is, latest injection quantity data or ignition timing data) in the write-in storage area selected at S210 this time as a valid data.

When the control data is written in the storage area I or II, type information indicating a type of control data and status information indicating "valid" or "invalid" are added.

In the present embodiment, the write-in data to be written in the storage areas I and II is defined as a data string corresponding to control data with type information, in which the type information of predetermined bits (for example, 3 bytes), the control data (that is, value of control data) of predetermined bits (for example, 4 bytes) and the status information of predetermined bits (for example, 1 byte) are arranged in series. This data string is referred to as type-affixed control data below. The CPU 31 writes the write-in data in the write-in storage area from a top address area in an ascending order or from a last address in a descending order. For example, in a case that the write-in data is 8-byte data and a data quantity per one address of the storage areas I and II is 2 bytes, each write-in data is written in a unit of 4 addresses.

The indication that the status information is valid means that the control data, to which such status information is affixed, is the latest one (latest value) among the same types of control data. The indication that the status information is invalid means that the control data, to which such status information is affixed, is not the latest one among the same types of control data. Writing the control data at S220 as the valid data means that the status information, which is the status information in the write-in data and affixed to the control data to be written, is made to be valid. That is, valid data means control data, affixed status information of which is valid. In the following description, an entirety of write-in data including control data, type information and "valid" status information is also referred to as valid data.

Figure 6:
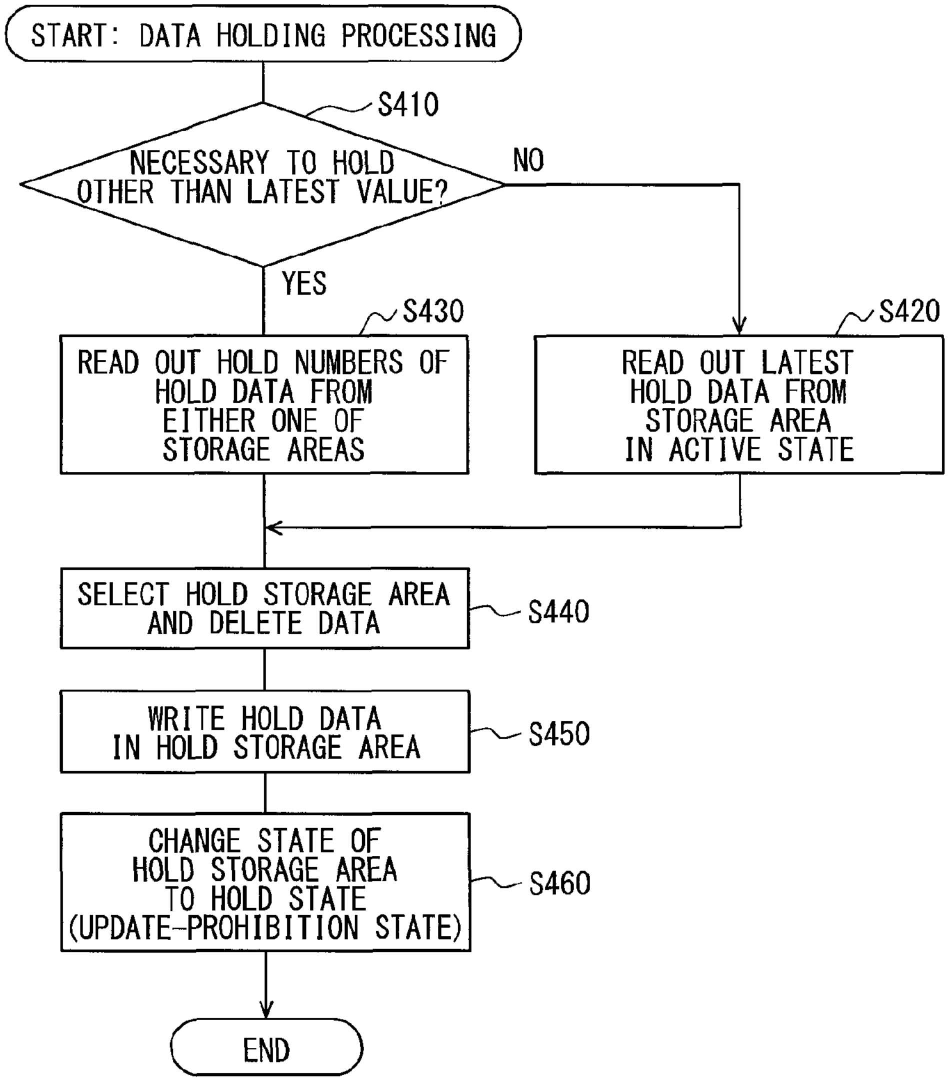
FIG. 6 is a flowchart showing data holding processing in the data processing shown in FIG. 2.

In a case that data is written in the storage area I or II at S270 and S450 in FIG. 6, write-in data is in a format, in which the type information and the status information are affixed to the control data, and written in the similar manner as in S220.

The CPU 31 checks at next S230 whether there are plural data, which are the same type as the control data written at S220 this time and valid, in the present write-in storage area. If there are the plural data (S230: YES), the CPU 31 executes S240.

The CPU 31 invalidates the past one (that is, data not written this time) among the plural pieces of valid data, which are in the write-in storage area. That is, the CPU 31 changes the status information from "valid" to "invalid."

More specifically, in the storage areas I and II, the bit of the status information, which indicates "valid," is a value (for example, "1"), which indicates the deletion state. For this reason, as the processing for changing the status information to "invalid," the CPU 31 executes the writing processing for changing the bit of the status information from "1" to "0." Changing the status information as described above, is for managing which one is the latest value among the control data of each of the various types.

After executing the processing of S240, the CPU 31 executes S250. The CPU 31 executes S250 when it is determined at S230 that there are not plural pieces of data, which are the same type as the control data written this time and valid, in the present write-in storage area, that is, the writing at S220 this time is the first writing of the control data of the same type, which is written this time.

The CPU 31 checks at S250 whether there is a vacant area in the present write-in storage area. If there is the vacant area, the CPU 31 finishes the writing processing. If there is no vacant area (S250: NO), the CPU 31 executes S260.

The CPU 31 selects at S260 the storage area, the order of use of which is the next from the present write-in storage area as the next write-in storage area. This selection is a preparation for the next data writing. However, in a case that the storage area II, the order of use of which is the last, of the storage areas I and II is the present write-in storage area, the CPU 31 selects the storage area I, the order of use of which is the first, as the next write-in storage area. The storage area in the hold state is excluded from a candidate of selection of the write-in storage area. For this reason, in a case that none of the storage areas I and II is not in the hold state, the storage area II is selected as the next write-in storage area when the storage area I is the write-in storage area this time, the storage area I is selected as the next write-in storage area when the storage area II is the write-in storage area this time. The CPU 31 further deletes at S260 the data in the write-in storage area, which is selected for the next write-in operation.

The CPU 31 selects at S270 the valid data stored in the present write-in storage area based on the status information and writes the selected valid data as the valid data in the next write-in storage area selected at S260. That is, the valid data is copied from the write-in storage area of this time to the next write-in storage area. In this copying, the type information is also copied.

The CPU 31 changes at next S280 the state of the present write-in storage area to the full state and sets the state of the next write-in storage area to the active state. By this processing, the next write-in storage area selected at S260 is selected at next S210 as the write-in storage area. At next S220, it is used as the present write-in storage area. In a case that the state of the next write-in storage area is in the full state before the processing of S280 is executed, it is changed from the full state to the active state by S280. The CPU 31 finishes the writing processing after executing the processing of S280.

The operation of the writing processing shown in FIG. 3 will be described next with reference to a detailed example shown in FIG. 4. In this example, as shown in (A) of FIG. 4, it is assumed that, before the writing processing is started, the storage area I is in the active state and the write-in storage area and the storage area II is in the full state. In the storage area I, two pieces of injection quantity data of different times (new and old), one ignition timing data and one other type of data (control data of other type) are stored. At this time, the storage area I still has a vacant area, which is available for writing one write-in data.

Figure 4:
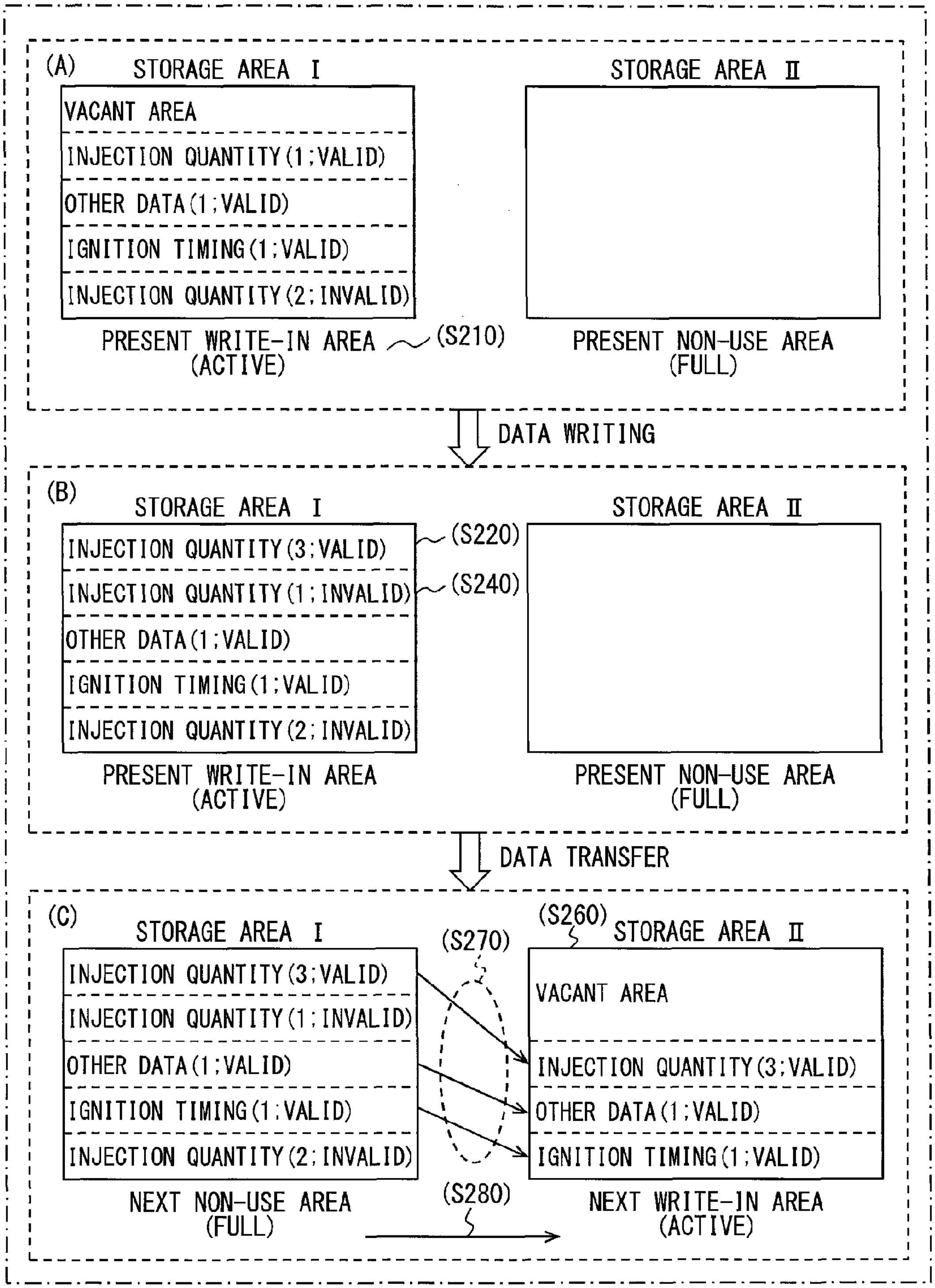
FIG. 4 is an explanatory diagram showing an operation of the writing processing shown in FIG. 3.

In each rectangular frame of the storage areas I and II in FIG. 4, "injection quantity," "ignition timing" and "other data" labeled at the left side of a bracket ( ) indicate type information of the control data. "n ("n" is integer number)" at the left half in the bracket indicates a value of the control data and "valid" or "invalid" at the right half in the bracket indicates status information. This is also true for FIG. 7, which will be described later.

In the state shown in (A) of FIG. 4, the CPU 31 selects the storage area I in the active state out of the storage areas I and II as the write-in storage area (S210) after starting the writing processing.

Assuming that the control data calculated this time is the injection quantity data, the CPU 31 writes the latest calculated injection quantity data in the vacant area of the write-in storage area (storage area I) as the valid data as shown in (B) of FIG. 4. In this case, because the injection quantity data has already been written in the write-in storage area, the write-in storage area comes to store two injection quantity data, the status information of which are both valid. The CPU 31 therefore determines YES at S230 in FIG. 3 and changes the status information of the injection quantity data, which is not written this time, from "valid" to "invalid" (S240).

The CPU 31 then checks at S250 in FIG. 3 whether there is a vacant area in the present write-in storage area. In this example, as shown in (B) of FIG. 4, there remains no vacant area in the storage area I because of the writing of this time. For this reason, the CPU 31 determines at S250 in FIG. 3 that there is no vacant area.

The CPU 31 therefore executes a preparation for the next data writing. That is, as shown in (C) of FIG. 4, the CPU 31 selects the other storage area II as the write-in storage area for the next writing and deletes all data in the storage area II (S260). Then the CPU 31 writes only all valid data stored in the storage area I, which is the present write-in storage area, into the storage area II, which is the next write-in storage area, as the valid data (S270). The CPU 31 further changes the storage area I from the active state to the full state not to use for at least the next data writing and changes the storage area II from the full state to the active state (S280).

Then new data is written in the storage area II. When there remains no more vacant area in the storage area II, all the data stored in the storage area I are deleted and only the valid data stored in the storage area II are copied into the storage area I as opposed to (C) in FIG. 4. Then the CPU 31 changes the storage area II for the active state to the full state and changes the storage area I from the full state to the active state. It is noted that the storage area II is in the full state at the time of (A) in FIG. 4, because the processing of S280 has already been executed before.

As a summary of the operation of the writing processing of FIG. 3, the CPU 31 executes the following operations <1> to <5> by execution of the writing processing.

<1> As the write-in storage area for the first time after the ECU 11 is assembled to a vehicle, the CPU 31 determines the storage area I, which has the first use order out of the plural storage areas I and II, to be the write-in storage area (S210).

<2> Each time the CPU 31 calculates any one of the plural types of control data (in this example, injection quantity data or ignition timing data) at S120 or S140 in FIG. 2, the CPU 31 writes the calculated control data, to which the type information is affixed, in the write-in storage area of this time (S220). In the present embodiment, the control data, which is affixed with the type information and stored in the storage areas I and II, is the write-in data, to which the status information indicating whether it is the latest value of the control data of the same type is affixed.

<3> When there remains no more vacant area in the present write-in storage area (S250: NO), the CPU 31 determines the storage area having the next use order is determined to be the next write-in storage area out of the plural storage areas I and II. The CPU 31 deletes the data in the next write-in storage area and executes the above-described operation <2> by setting the next write-in storage area as the present write-in storage (S260, S280 to S210).

<4> When the storage area II, the use order of which is the last among the plural storage areas I and II, is the present write-in storage area and has no more vacant storage area, the CPU 31 sets the storage area I, the use order of which is the first, as the next write-in storage area (S260).

<5> After deleting the data in the next write-in storage area because of no vacant storage area in the present write-in storage area, the CPU 31 executes data selection and data writing before starting the above-described operation <2>. That is, the CPU 31 selects only the control data (that is, valid data), to which the latest type information is affixed, for each type of control data out of the plural pieces of control data, which are stored in the present write-in storage area, and writes the selected valid data in the next write-in storage area (S270).

Figure 5:
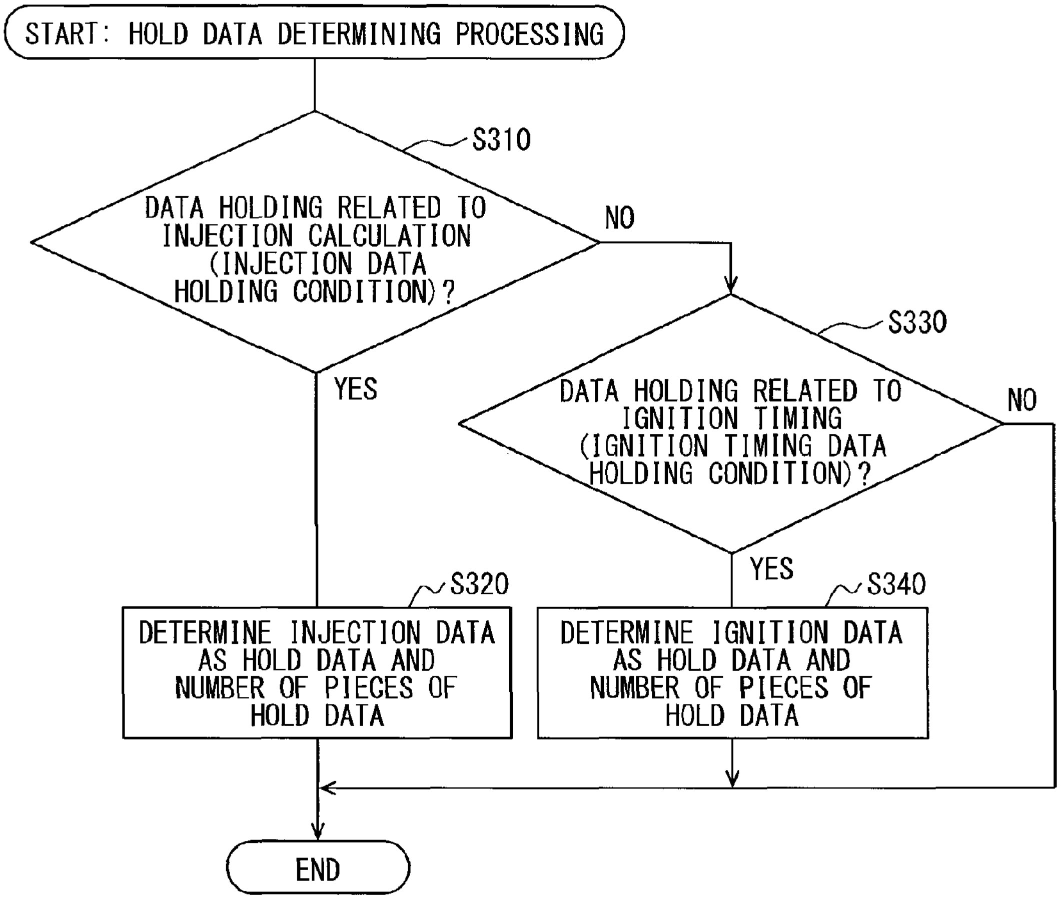
FIG. 5 is a flowchart showing holding data determining processing in the data processing shown in FIG. 2.

The hold data determining processing executed at S170 in FIG. 2 will be described next with reference to FIG. 5. As shown in FIG. 5, the CPU 31 checks at S310 whether the data related to the injection quantity calculation (simply referred to as injection calculation) need be held, after starting the hold data determining processing. This checking is for checking whether a hold condition of the injection quantity data is satisfied, that is, condition for executing holding of the injection quantity data is satisfied. For example, in a case that an abnormality, to which the injection quantity is related possibly, is detected, the CPU 31 determines affirmatively (YES) that the data related to the injection quantity calculation need be held, that is, the condition for holding the injection quantity data is satisfied. The abnormality, to which the injection quantity is related possibly, includes an abnormality that a difference between a target value and a detected value of an air-fuel ratio is equal to or larger than a predetermined value.

In a case of determination of YES at S310, the CPU 31 executes S320. The CPU 31 determines the injection quantity data (simply referred to as injection data) as the hold data, determines the number of pieces of the injection quantity data to be held, that is, to be kept stored, and then finishes the hold data determining processing.

In a case of determination at S310 that the data related to the injection quantity calculation need not be held, that is, the condition for holding the injection quantity data is not satisfied, the CPU 31 executes S330 to check whether the data related to the ignition timing calculation (simply referred to as ignition calculation) need be held. This checking is for checking whether the hold condition of the ignition timing data is satisfied, that is, condition for executing holding of the ignition timing data is satisfied. For example, in a case that an abnormality, to which the ignition timing is related possibly, is detected in the above-described abnormality detection processing, the CPU 31 determines affirmatively at S330 that the data related to the ignition timing calculation need be held, that is, the condition for holding the ignition timing data is satisfied. The abnormality, to which the ignition timing is related possibly, includes an abnormality such as misfire and continuation of knock.

In a case of determination of YES at S330, the CPU 31 executes S340. The CPU 31 determines the ignition timing data as the hold data, determines the number of pieces of the ignition timing data to be held, that is, to be kept stored, and then finishes the hold data determining processing.

The hold data and the number of pieces of hold data, which are determined at S320 and S340 for each satisfied hold condition, are determined in the program of the ROM 37. That is, the hold data and the number of holding of such hold data are determined for each hold condition of the control data and the determined contents are stored in the ROM 37 as a part of the program.

In a case that the data related to the ignition timing calculation need not be held, that is, the condition for holding the ignition timing data is not satisfied, at S330, the CPU 31 finishes the hold data determining processing. It is noted here that in the above-described operation, two types of data, that is, the injection quantity data and the ignition timing data, are exemplified as the control data, which will possibly become the hold data. In a case that other control data than the injection quantity data and the ignition timing data are also the hold data, the CPU 31 determines the other types of control data as the hold data and determines the number of holding of such control data after determining NO at S330.

The data holding processing executed at S180 in FIG. 2 will be described next with reference to FIG. 6. As shown in FIG. 6, the CPU 31 checks at S410 whether the hold data determined in the hold data determining processing (FIG. 5) should also include data other than the latest data. Specifically, the CPU 31 checks whether the number of holding of the hold data determined in addition to the hold data at S320 or S340 in FIG. 5 is 2 or more. When the CPU 31 determines that the number of holding is 1 and data other than the latest value is not needed (S410: NO), the CPU 31 executes S420.

The CPU 31 reads out the latest hold data into the RAM 39 from the storage area in the active state (that is, present write-in storage area) and executes S440.

Reading out the hold data is for reading out the entire string of written data, which includes the control data as the hold data, the type information data and the status data. The hold data is specified by the type information affixed to the data. For reading out the latest hold data from the storage area in the active sate, it is only necessary to read out the hold data, the status information of which is "valid."

As another example of reading out the latest hold data, the data, the latest written data among the hold data stored in the storage area in the active state may be read out. This means that the hold data, the status information of which is "valid," is read out. That is, the CPU 31 can check whether the data written in the storage areas I and II is new or old based on the order of writing in the storage areas I and II. The order of writing is also the order of generating data and can be checked based on the address, in which the data is stored.

When the CPU 31 determines at S410 that even the hold data, which is not the latest value, need be stored, that is, the number of holding is 2 or more and the data need be held in time sequence, the CPU 31 executes S430.

The CPU 31 reads out at S430 the hold data from either one of the storage areas I and II into the RAM 39 in the order from the latest one and by a number of hold data. Specifically, based on the order of writing of the hold data in the storage areas I and II, the CPU 31 specifies the number of hold data from the latest one among the hold data having been stored in the storage areas I and II and reads out the specified number of the hold data into the RAM 39. In determining the order of data storing, the oldest hold data in the present write-in storage area and the latest hold data in the previous write-in storage area are treated as the same data. This is because the processing of S270 is executed. For this reason, if the data flash 35 used for updating and storing the control data is assumed to have three storage areas, the oldest hold data in the previous write-in storage area and the latest hold data in the write-in storage area in the previous writing are also treated similarly (refer to dotted arrow in FIG. 9 described later).

After execution of S430, the CPU 31 executes S440. The CPU 31 selects at S440 either one of the storage areas I and II as a hold storage area (corresponding to data holding area) for holding the hold data and deletes the data stored in the selected hold storage area.

At S440, it is preferred to select as the hold storage area the storage area, which was the oldest write-in storage area relative to the present write-in storage area. This is because that the oldest past data is assumed to be stored in that storage area. In view of this assumption, it is preferred to select the storage area in the full state as the hold storage area. In a case that there are three or more storage areas and there are two or more storage areas in the full states, it is preferred to select as the hold storage area the storage area, which was the write-in storage area in the oldest time, among the storage areas in the full state.

The CPU 31 writes into the hold storage area the hold data read out at S420 or S430. The hold data is written in the hold storage area in a format form including the type information and the status information. In this case, the status information of all the hold data, which is to be written, is set to "valid" for example. In a case that the processing of S430 is executed and the hold data are plural and time-oriented, each time-oriented hold data is written in the hold storage area in the same order as it has been written in either of the storage area I or II at S220 in FIG. 3 (that is, in chronological order) for example. For this reason, each hold data kept stored in the hold storage area is new as it is written later.

By the processing of S430, S440 and S450, even when the hold data are not stored as chronological data, that is, not held in the chronological order, the data can be written and held in the hold storage area as the chronological data, that is, held in the chronological order.

The CPU 31 then changes at next S460 the state of the hold storage area to the hold state. By this processing of S460, the storage area, which has been used for updating and storing of the control data so far, is used as the storage area exclusive for data holding. The CPU 31 then finishes the data holding processing.

The data holding processing shown in FIG. 6 will be described below with reference to a detailed example shown in FIG. 7. In this example, it is assumed that the storage areas I and II are in the states shown in (A) of FIG. 7 at time before the data holding processing is started. It is further assumed that the hold data is the injection quantity data and the number of pieces of data to be held is three.

After starting the data holding processing, the CPU 31 determines YES at S410 in FIG. 6 and executes S430, because the number of pieces of data, which are held, is three. In this example, as shown in (A) of FIG. 7, since the three (3) pieces of injection data are stored in the storage area I in the active state, the CPU 31 reads out the stored three pieces of injection quantity data from the storage area I at S430.

Then the CPU 31 selects the storage area II in the full state out of the storage areas I and II as the hold storage area and deletes the data stored in the storage area II. As a result, the storage area II all become vacant as shown in (B) of FIG. 7.

Figure 7:
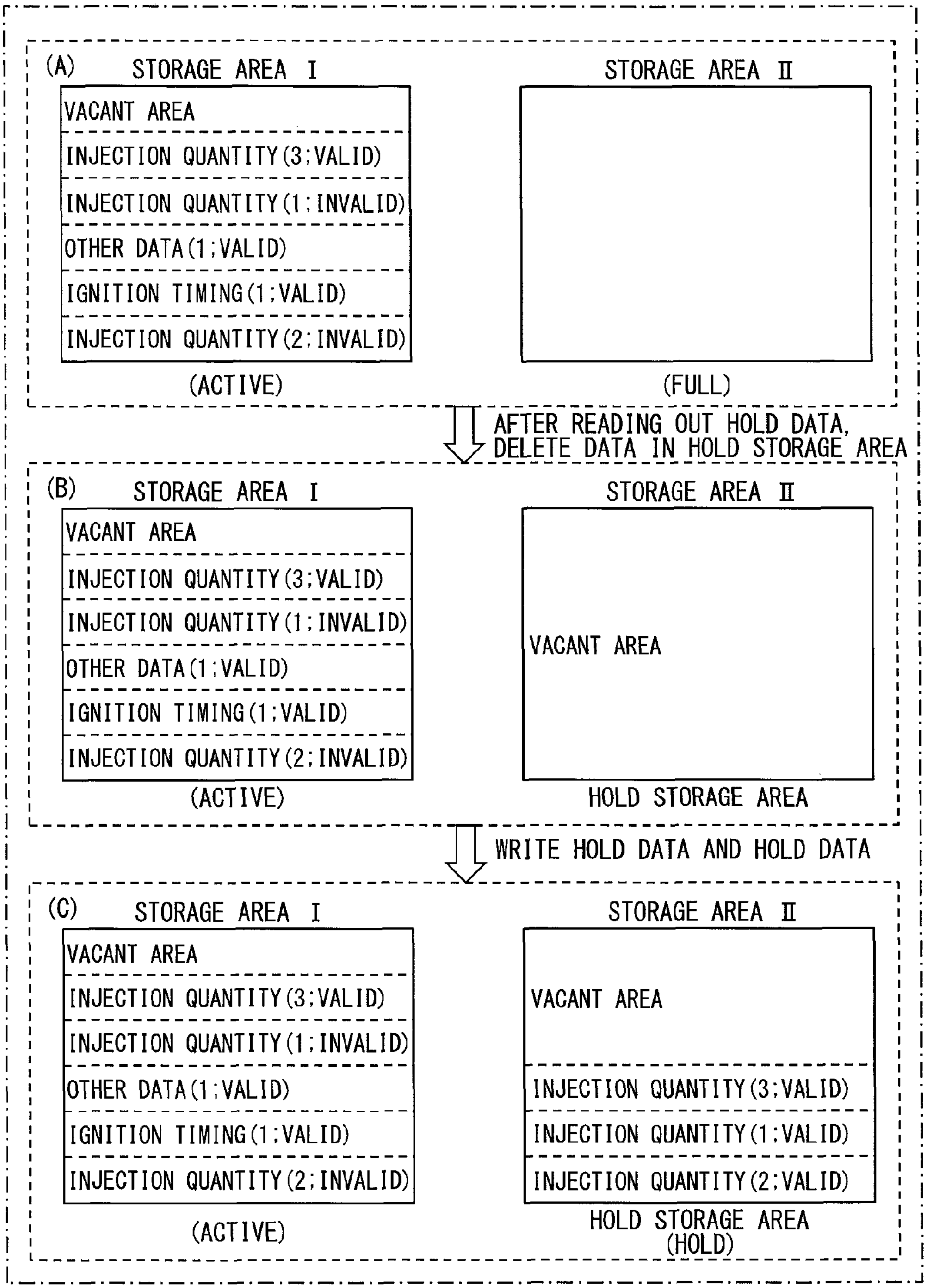
FIG. 7 is an explanatory diagram showing an operation of the data holding processing shown in FIG. 6.

The CPU 31 writes as the valid data the injection quantity data (in this example, three) read out at S430 into the storage area II selected as the hold storage area as shown in (C) of FIG. 7. Each injection quantity data is written into the hold storage area in the order of older data, that is, in the chronological order. Finally the CPU 31 changes the state of the storage area II, which is the hold storage area, from the full state to the hold state to prohibit writing and deleting of data in the storage area II thereafter (S460).

The number of storage areas of the data flash 35 used for updating the control data is not limited to 2 but may be 3 or more. For example, in a case that the storage areas I to III are used, the control data will be updated as described below with reference to FIG. 8 and FIG. 9. The order of use of the storage areas I to III is from "storage area Ito storage area III through storage area II."

Figure 8:
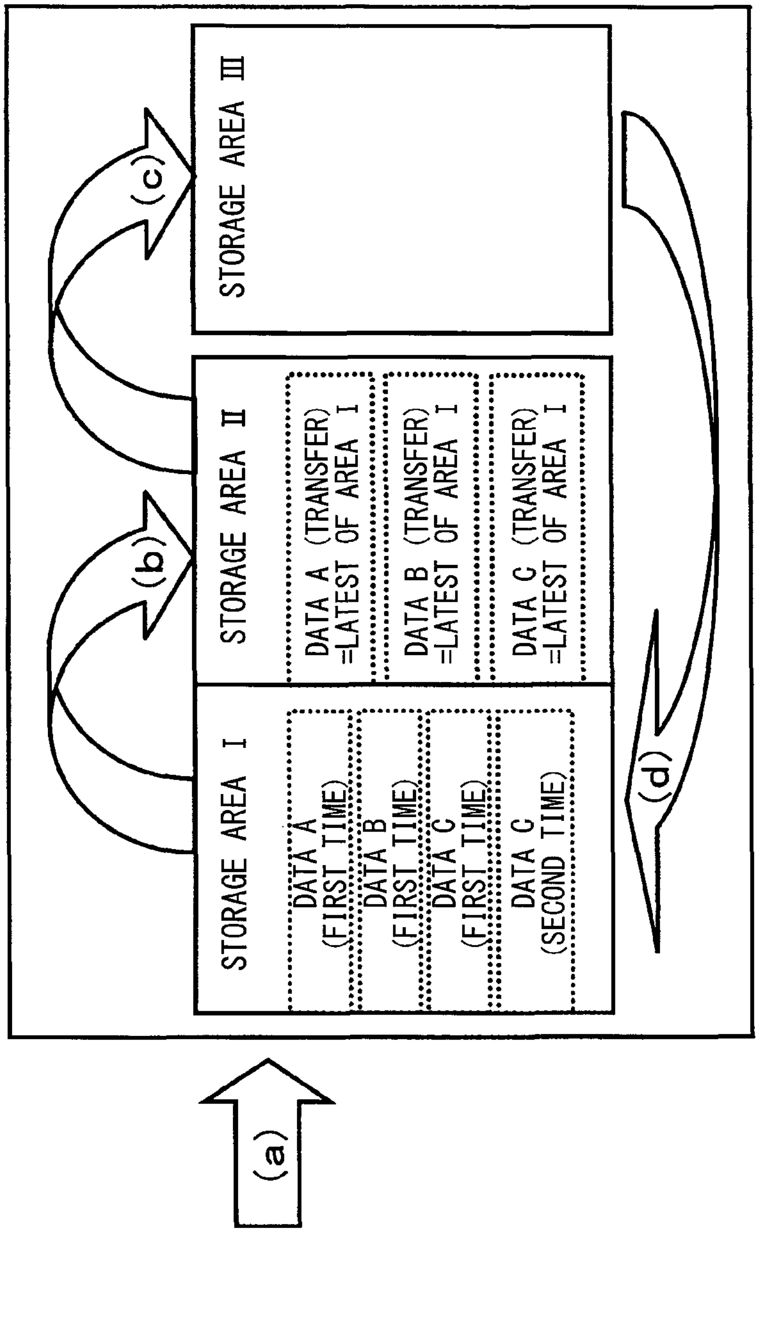
FIG. 8 is an explanatory diagram showing an operation of the writing processing in a case of three storage areas.
Figure 9:
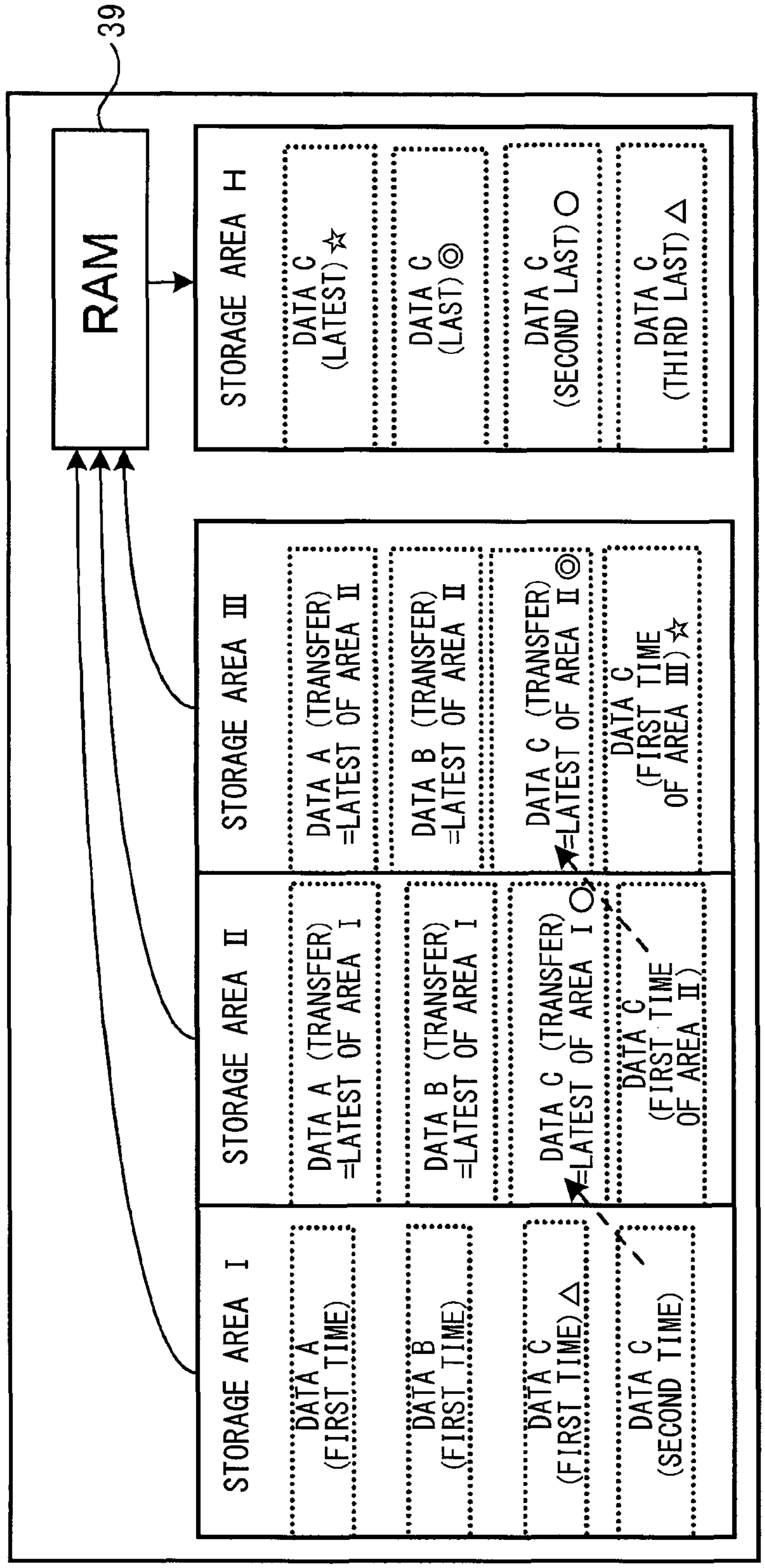
FIG. 9 is an explanatory diagram showing an operation of the data holding processing in the case of three storage areas.

In FIG. 8 and FIG. 9, each of the data A, B and C is the three types of control data calculated by the CPU 31. In each of the storage areas I to III, the data affixed with "(first time)" is data, which was written for the first time in the storage area at S220 in FIG. 3 among the same type of data. The data affixed with "(second time)" is data, which was written in the second time in the storage area at S220 in FIG. 3 among the same type of data. In each of the storage areas I to III, the data affixed with "(transfer)" is the data, which was copied at S270 in FIG. 3. It is the last data (that is, last value) among the same types, which were stored in previous write-in storage area.

The operation of the writing processing shown in FIG. 3 will be described first with reference to an example shown in FIG. 8.

<a> In FIG. 8, as indicated by an arrow (a), the CPU 31 sets the storage area I as the write-in storage area for the first time and writes various pieces of control data in the storage area I.

When the same type of data as the data (in this example, data C), which is already present, is written in the write-in storage area, it is not written over the old data but written in a new address by changing the status information of the old data to "invalid" and setting the status information of the latest data to "valid."

<b> When there remains no more vacant area in the storage area I, the CPU 31 deletes the data in the storage area II, the use order of which is next, and transfers (copies) the latest value (that is, valid data) of each type stored in the storage area Ito the storage area II as indicated by an arrow (b). Then the CPU 31 sets the storage area II as the write-in storage area and writes new control data in the storage area II.

<c> When there remains no more vacant area in the storage area II, the CPU 31 deletes the data in the storage area III, the use order of which is next, and transfers (copies) the latest value (that is, valid data) of each type stored in the storage area II to the storage area III as indicated by an arrow (c). Then the CPU 31 sets the storage area III as the write-in storage area and writes new control data in the storage area III.

<d> When there remains no more vacant area in the storage area III, the CPU 31 deletes the data in the storage area I, the use order of which is the first, and transfers (copies) the latest value (that is, valid data) of each type stored in the storage area III to the storage area I as indicated by an arrow (d). Then the CPU 31 sets the storage area III as the write-in storage area and writes new control data in the storage area III.

Then the CPU 31 repeats the operations <b> to <d> described above. In a case that the data in the storage area I is not deleted at the time of manufacture of the ECU 11, the CPU 31 needs to delete the data in the storage area I before starting the writing into the storage area I for the first time in the operation <a> described above. In a case that the data in the storage areas II and III have already been deleted at the time of manufacture of the ECU 11, the CPU 31 need not delete the data in the storage areas II and III at the time of executing each of the operations <b> and <c> described above for the first time.

The data holding processing shown in FIG. 6 will be described next with reference to an example of FIG. 9. It is assumed that, in a case that the storage area III, for example, is set as the write-in storage area among the three storage areas I to III, the CPU 31 determines that the hold condition for data C is satisfied and the number of pieces of hold data C, which are stored, is 4.

In this case, the CPU 31 reads out four latest data C from the storage areas I to III into the RAM 39 as shown in FIG. 9. In this example, among the data C in the storage area III, the data C marked with "☆" is the data C, the status information of which is "valid" and the latest data C. The data C marked with "◎" is the data C, which is the second-latest data C. Further, among the data C in the second storage area II, the data C marked with "○" is the data C, which is the third-latest data C. Among the data C in the storage area I, the data C marked with "Δ" is the data C, which is the fourth-latest data C. Those four pieces of data C are read out into the RAM 39.

As indicated by dotted arrows in FIG. 9, the data C marked with "◎" is the same as the data C affixed with "(first time)" in the storage area II. The data C affixed with "(first time)" is the data, which is copied form the storage area II to the storage area III by the processing S270 of FIG. 3. The data C marked with "○" is the same as the data C affixed with "(second time)" in the storage area I. The data C affixed with "(second time)" is the data, which is copied form the storage area I to the storage area II by the processing S270 of FIG. 3.

Then the CPU 31 selects one of the storage areas I to III as a hold storage area H. For example, as described above, the storage area I, which has been set as the oldest write-in storage area relative to the present write-in storage area (in this example, storage area III), is selected as the hold storage area H. The CPU 31 writes the four data from the RAM 39 into the hold storage area H after deleting the data in the selected hold storage area H, and then sets the state of the hold storage area H in the hold state.

In the ECU 11 described above, the CPU 31 of the microcomputer 13 sequentially writes the control data, that is, type-affixed control data, to which the type information is affixed, each time of calculation of the control data in the storage areas I and II (I to III) of the data flash 35 as the data write-in storage areas. When the CPU 31 determines that the hold condition corresponding to any one of the plural types of control data is satisfied, the CPU 31 reads out the type-affixed control data including the control data, which corresponds to the satisfied hold condition, from the storage areas I and II (I to III) based on the type information and writes the type-affixed control data thus read out in the hold storage areas (corresponding to data holding areas) in the data flash 35.

For this reason, when the hold condition for holding a certain type of the control data is satisfied, only the control data, which corresponds to such a hold condition and need be held, can be held in the hold storage area. Thus the number of hold storage areas corresponding to the data holding areas can be reduced.

Further, the hold conditions are plural and, for each hold condition, the hold data, which is the control data to be held in the hold storage area, and the number of pieces of such data to be held are predetermined. In the case that the number of holding the hold data corresponding to the satisfied hold condition is N (integer equal to 1 or more), the CPU 31 reads out N pieces of the type-affixed control data including the hold data in the order from the latest one, that is, chronologically in reverse order, and writes the N pieces of the type-affixed control data read out as described above in the hold storage area (S410 to S430, S450). For this reason, the number of pieces of data to be written in the hold storage area can be reduced to a requisite minimum (that is, predetermined hold number).

The CPU 31 determines whether the type-affixed control data written in the storage areas I and II (I to III) are new or old based on the order of writing in the storage areas I and II (I to III). Thus it can be determined accurately whether the data is new or old.

In the data flash 35, the storage area used for update storing of the control data includes plural storage areas I and II (I to III). The CPU 31 writes the type-affixed control data in one of the storage areas I and II (I to III). In the case that the one storage area has no vacancy for writing any more, the CPU 31 writes the type-affixed control data in the other of the storage areas I and II (I to III). The CPU 31 uses any one of the storage areas I and II (I to III) as the hold storage areas (S440). For this reason, in the data flash 35, it is not necessary to provide an exclusive storage area as the hold destination areas preliminarily. As a result, the number of storage areas can be reduced.

When the CPU 31 completes writing the type-affixed control data in the storage area as the hold storage area, the CPU 31 sets the state of such a storage area (that is, hold storage area) in the hold state and prohibits writing and deleting data in that storage area. For this reason, the data stored is prevented from being lost. Thus data holding can be performed surely.

Further, the order of use of the plural storage areas I and II (I to III) is predetermined and the CPU 31 performs the above-described operations <1> to <4> as the operations of writing the control data in the storage areas I and II (I to III). For this reason, each control data can be updated and stored in the order from the newest one. Since the CPU 31 further performs the above-described operation <5>, the latest data can be maintained surely for each type of control data.

The electronic control unit 11 described above is not limited to the embodiment described above but may be implemented in other ways. The numeric values described above are only exemplary and may be other values. For example, the number of holding the hold data need not be predetermined. In the data holding processing, all the hold data stored in the storage areas I and II (I to III) by the writing processing of FIG. 3 and of any order may be held in the hold storage areas.

Among storage areas of the data flash 35, storage areas, which are different from the storage areas I and II (I to III) used in updating and storing the control data, may be used as the hold storage areas. Of the storage areas I and II (I to III), the storage area in the active state may be used as the hold storage area.

The status information may not be affixed to the control data, which are to be written in the storage areas I and II (I to III). It is however advantageous that the latest data can be searched easily when the status information is affixed.

Even in a case that the types of the control data are same, the number of data to be held (number of holding) may be changed in accordance with types of detected abnormality (failure mode). Two or more types of control data may be set as the hold data for one hold condition.

The data write-in area may be only one storage area. The non-volatile memory, which is rewritable of data, is not limited to the data flash but may be, for example, an EEPROM, which is also a non-volatile memory.

What is claimed is:

1. An electronic control unit comprising:

a processing unit for calculating plural types of control data used for controlling a control object; and a non-volatile memory, which is rewritable of data and connected to the processing unit, wherein the processing unit is programmed to execute writing processing to write sequentially type-affixed control data, in each of which type information indicating a type of control data is affixed to the control data, into data write-in areas in the non-volatile memory, and wherein the processing unit is further programmed to read out, when a hold condition corresponding to one of the plural types of control data is satisfied, the type-affixed control data including the control data corresponding to a satisfied hold condition from the data write-in areas based on the type information, and write the type-affixed control data read out from the data write-in area in a data holding area of the non-volatile memory.

2. The electronic control unit according to claim 1, wherein:

the processing has plural hold conditions, for each of which control data to be held in the data holding area as hold control data and a number of the hold control data are predetermined; and the processing unit is programmed to read out, when the number of the hold control data corresponding to the satisfied hold condition is N, which is an integer equal to 1 or more, latest N pieces of the type-affixed control data including the hold control data from a latest data from the data write-in area, and writes the N pieces of the type-affixed control data.

3. The electronic control unit according to claim 2, wherein:

the processing unit is programmed to check whether the type-affixed control data written in the data write-in area is old or new based on an order of data writing in the data write-in area.

4. The electronic control unit according to claim 1, wherein:

the data write-in area includes plural storage areas of the non-volatile memory;

the processing unit is programmed to sequentially write the type-affixed control data in one of the plural storage areas, the processing unit is programmed to write the type-affixed control data in another one of the plural storage areas when the one of the plural storage area has no vacant area, and the processing unit is programmed to use either one of the plural storage areas as the data holding area.

5. The electronic control unit according to claim 4, wherein:

the processing unit is programmed to prohibit writing and deleting in the storage area used as the data holding area, when writing the type-affixed control data into the storage area among the plural storage area used as the data holding area.

6. The electronic control unit according to claim 4, wherein:

an order of the plural storage areas to be used as the data write-in area, into which the type-affixed control data is written, is predetermined; and the processing unit is programmed to execute following operations <1> to <4>, <1> set the storage area, which has a first use order among the plural storage areas, as the write-in storage area, <2> each time any one of the plural types of control data is calculated, write the type-information-affixed control data into the write-in storage area of this time, <3> when there remains no vacant area in a present write-in storage area, set the storage area having a next use order among the plural storage areas as a next write-in storage area, delete data in the next write-in storage area and executes the operation <2> by setting the next write-in storage area as the present write-in storage area, and <4> when the storage area, the use order of which is the last among the plural storage areas, is the present write-in storage area and has no more vacant area, set the storage area, the use order of which is the first, as the next write-in storage area.

7. The electronic control unit according to claim 6, wherein:

the processing unit is programmed to select, after deleting data in the next write-in storage area because of no vacant area in the present write-in storage area, the latest type-information-affixed data out of the type-affixed control data stored in the present write-in storage area for each type of the control data before starting the operation <2>, and write selected type-affixed control data in the next write-in storage area.

* * * * *